July 10, 1945.                E. W. BATTERSON ET AL                2,380,015
                              HEAVY DUTY CONTROL CABLE
                              Filed July 17, 1943                2 Sheets-Sheet 1
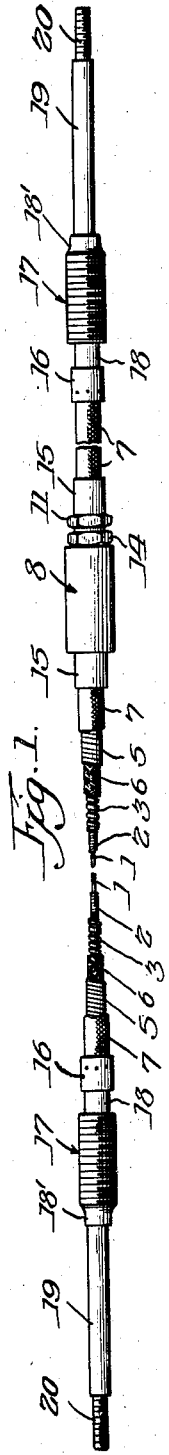
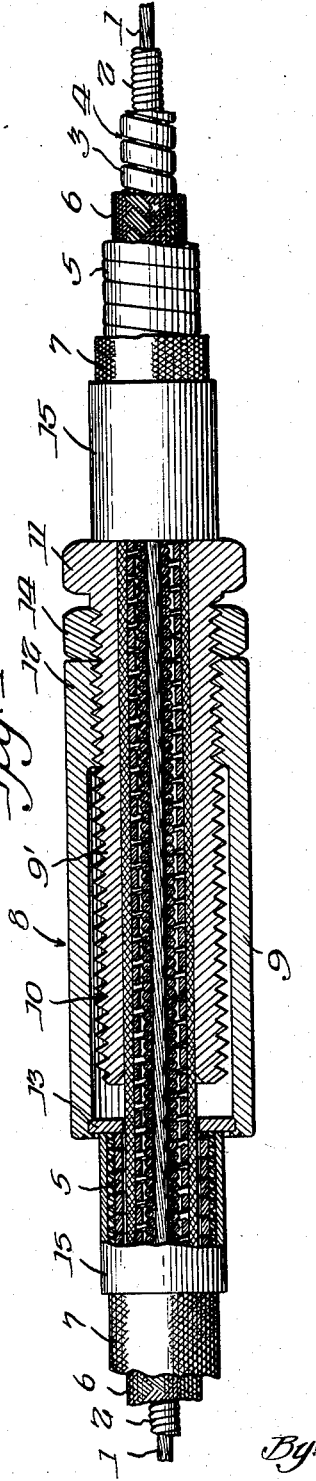
Inventors:
Ernest W. Batterson &
Eugene A. Midling.
By: W. F. Kellogg    Atty.

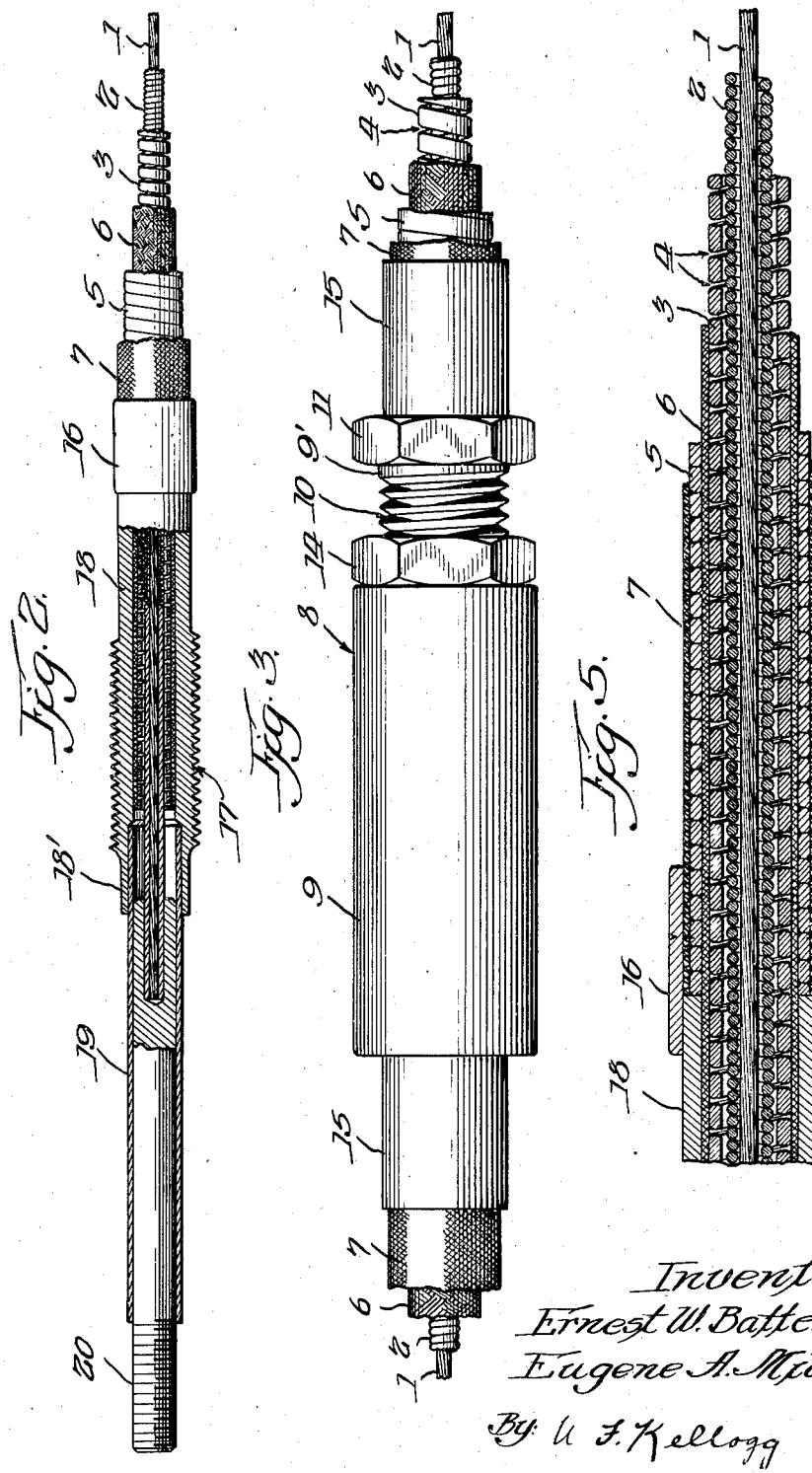

Patented July 10, 1945

2,380,015

UNITED STATES PATENT OFFICE 2,380,015

HEAVY-DUTY CONTROL CABLE

Ernest W. Batterson and Eugene A. Midling, Kalamazoo, Mich., assignors to Shakespeare Products Company, Kalamazoo, Mich., a corporation of Michigan Application July 17, 1943, Serial No. 495,402

9 Claims. (Cl. 74—501)

This invention relates to improvements in those types of flexible control cables adapted to transmit linear motion from one point to another for various purposes, as for example, the transmittal of operative control motion from appropriate control operating fittings connected thereto, to apparatuses and devices to be operatively controlled thereby through the medium of such transmitted motion; the invention having for an object to provide a flexible control which, in usage, will afford a maximum degree of compression and tension resistivity to loads applied thereto, and a corresponding degree of flexibility whereby to permit its satisfactory installation and operation in and through irregular or tortuous receiving spaces. The application is companionate to our pending application for United States Letters Patent, Serial Number 494,086, filed July 9, 1943.

It is also an object of the invention to provide a control of the above stated character, so constructed as to permit and ensure the faithful transmittal of control motion from its operating fitting equipped end to the opposite end thereof which is connected to the control provided apparatus or device.

Moreover, it is an object of the invention to provide a control whose composite construction is such that only a minimum of elongation will occur in the conduits or casings thereof at those times when it is installed in and through irregular or tortuous ways, i. e., bent about objects located between the motion receiving and motion transmitting ends thereof, and wherein that elongation which does so occur, can be satisfactorily compensated for prior to operative connection of the control.

An equally important object is to provide a motion or play take-up device for the control cables, whereby any play existing between the secondary coil member of such cable and the control cable end fittings, following an installation requiring its bending and curving about and around intermediate objects, with its resultant elongation, may be effectually removed, thus, allowing the secondary coil member to take compression loads directed onto the cable and the primary coiled member, when compression and tension loads are, respectively, exerted by the control motion transmitting inner member.

Yet another object of our invention is to provide a flexible control cable, such as above referred to, with a flexure travel take-up, whereby should or when the cable be or is flexed through its length or bends, following installation and during actual operation of the control, said take-up will function to accommodate either the lengthening or shortening of the cable secondary member.

The foregoing, as well as other objects, advantages and meritorious teachings of the invention, will be in part obvious and in part pointed out in the following detailed disclosure thereof, when taken in conjunction with the accompanying drawings, it being understood that the particular forms of the invention presented herein are what is now considered to be the best modes of embodying its principles, but that modifications and changes may be made in specific embodiments without departing from its essential features.

In a prefatory sense, it may be stated that we are aware, by reason of long and practical industrial experience, that much effort and many productions have been heretofore effected with a view towards providing control motion transmitting devices and flexible conduits and cables possessing individual and combined qualities of compression and tension resistivity and flexing tolerance, whereby to permit their practical installation and operation. However, insofar as we are aware, these developments have not provided the industry with overall satisfactory results or teachings. In some such developments, tension resisticity efficiency has been sacrificed for a betterment of compression resistivity efficiency, while in others a converse sacrifice has been made, and in still others, the great importance and necessity of flexing efficiency in such devices has been sacrificed to one or both of the requirements for compression and tension resistivity. Hence, there exists at this time, definite need for a control motion transmitting device and assembly embodying physical instrumentalities of design, character and combination capable of effectually and satisfactorily complying with the aforesaid requirements in their entireties, to wit, efficient compression and tension resistivity in combination with a maximum of bodily flexing efficiency, along with the ability of the device to faithfully transmit that control motion initially imparted thereto.

By means of our improved control, based upon the results of thorough and exacting experimental and test usage, we have provided a control assembly construction affording a maximum of compression and tension resistivity and flexibility, capable of being satisfactorily installed and effectually operated in and through restricted areas or ways which require its multi-angular flexing or bending; as for example, installations wherein the motion transmitting inner member and the control assembly conduits or casings are required to be passed through tortuous paths from the point of the control operating fittings to the point of connection of the control to or with that apparatus or device to be operatively controlled thereby. Moreover, the construction of our improved control is such that, in addition to providing an overall satisfactory resistance to compression and tension loads, whereby to effectually transmit control motion through an irregular path of travel, the component elements of the construction will, irrespective of the character or degree of their bending or flexing, faithfully retain a fixed, invariable length with respect to the unitary structure. In consequence, loss of effective operating control of the motion transmitting inner member of the control will be avoided. The control adjustment or motion imparted thereto from the operating fittings will be transmitted thereby and accurately reproduced at the point of connection of the device with controlled mechanism for ensuring its efficient control or adjustment, notwithstanding the fineness of the degree of such operations.

In these drawings:

Figure 1 is a fragmentary side elevation of our improved control device with parts of the cable broken away.

Figure 2 is a longitudinal section through one of the cable connecting and operating fittings, with parts thereof and the flexible cable in elevation.

Figure 3 is a side elevation of our improved manual end play take-up, showing the same attached to fragments of the flexible cable.

Figure 4 is a longitudinal section through the manual end play take-up, showing it installed or operatively positioned with respect to the flexible cable, portions of which are in elevation and other portions, in section; said take-up being shown in its non-extended position.

Figure 5 is a fragmentary longitudinal section through the inner end portion of one of the connecting fittings and the adjacent and connected end of the flexible cable, and Figure 6 is a longitudinal section through a modified form of motion take-up, i. e., an automatic spring take-up, showing its operative relationship to those portions of the flexible cable receiving the same.

Having more particular reference to the drawings, in connection with which like characters of reference will designate corresponding parts throughout, the improved control consists of the usual inner member (motion transmitting member), comprising a flexible cable 1, encased in a tightly coiled wire or helical formation 2, and an outer member which slidably receives the inner member therein.

The outer member is comprised of several component elements; first, a pretensioned primary coiled wire or helical formation 3, having its coils or convolutions relatively spaced in a manner to provide small gaps of substantially uniform widths between each thereof, as generally indicated by the numeral 4; and second, a secondary coiled wire or helical formation 5, the coils of which are, in contradistinction to the coils of the primary coil 3, arranged in close relationship.

Because of the relative spacing or gaps 4 between the coils or convolutions of the primary coil or member 3, the same will not elongate upon bending, in that said coil bends upon its neutral axis and consequently, the factor of elongation is obviated.

A tightly braided wire sheath 6 encases the primary coiled wire or member 3 and by reason of its construction and snug engagement along and about it, provides a support therethrough which functions to prevent elongation of the primary coil or member 3 under comparatively heavy tension loads from the inner member 1, 2. It will be noted that the braided wires constituting the sheath 6 are arranged in groups and that these groups are relatively braided.

As above indicated, the primary coil 3 and its braided wire sheath 6 are snugly received in the closely or tightly coiled secondary wire coil or member 5 which, in turn, is covered by a tightly woven fabric 7, coated or impregnated with a suitable oil and water resisting composition or material. The secondary wire coil 5, together with its covering 7, produces an additional support for the inner member, comprising the flexible cable 1 and the helical formation 2, which will resist heavy compression loads not within the capacity of the primary coil 3.

Regarding construction and modes of operation of heretofore prevalent types of controls, and in order that the meritorious, novel and original features of our improved control may be better identified, recognized and appreciated, it is well to, at this point, set forth that when the inner member of such former type of control has a tension load applied thereto, such application results in an effort, on part of said member, to straighten out. This, in turn, transmits or imposes a compression load onto the outer member. Conversely, when a compression load is placed on said inner member, the same will tend to bend thereunder, and this results in a tension load being applied onto the outer member. If the tension load thus applied to the outer member exceeds the initial tension with which it was originally coiled, lengthening of the same results and so, causes failure of the control, due to loss of effective travel. Also, the outer member, when bent, elongates in a ratio directly proportional to the number of degrees of such bend. This results in a loss of travel in the control, inasmuch as the inner member does not elongate (because of its smaller diameter) the same amount as the larger outer member. Consequently, to guarantee any such flexible control for factors as above, allowance for this lengthening of the outer member must be taken into consideration. Heretofore, it has either been taken into consideration at the time of the design of the control, or has been neglected entirely, and the control merely designed with an overall travel in it.

With a view toward providing a secondary outer member of our improved control with means which will permit adjustment of the same for end play removal, after said control has been installed, and moreover, which will effectually compensate for its elongation, we provide a manually adjustable type of take-up, generally identified by the numeral 8. At this point, it will be noted that in the illustrated installation of the improved take-up 8, the secondary coiled wire member 5, together with its covering 7, is divided intermediately of its opposite ends. The take-up is positioned between and adjacent the ends of said intermediately divided member 5 and, as shown in Figure 4 of the accompanying drawings, receives the inner member 1, 2 and the sheathed primary outer member 3 therethrough, as hereinafter more fully explained. Said take-up is adapted to be manually operated and consists of body sections 9 and 9'. The body section 9' is of tubular or sleeve-like formation, externally screw threaded substantially throughout its entire length, as indicated at 10, and has a nut or multi-sided shouldered formation 11 integral with or fixed to its normally outer end. The body section 9 is also of tubular or sleeve-like formation. Its diameter, however, is greater than that of the body section 9', in order that the latter may be received by or extended into the former, as is well shown in Figure 4. In order that longitudinally adjustable connection may be effected between the body sections 9 and 9' of the take-up, whereby to increase or decrease their combined overall length, for a purpose which will be hereinafter more fully described, one end (the normally inner end) of the body section 9 is constricted in the manner indicated at 12, and internally screw threaded. The internal screw threads of the constricted inner end portion 12 are adapted to have screw threaded engagement with the externally screw threaded peripheral surface of the body section 9'. The normally outer or remaining end of the body section 9 fixedly receives an apertured end wall or ring 13 therein.

To lock or secure the above described telescopically engaged body sections 9 and 9' in relative longitudinally adjusted relationships, we may and preferably do engage a lock nut 14 with the threads of the body section 9' (see Figure 4). This lock nut, as will be understood, is adapted to be brought into binding or locking engagement with the adjacent and normally inner end of the body section 9, following a desired or required longitudinal adjustment between the several said body sections.

As hereinbefore stated, the secondary outer member 5 and its fabric covering 7 are divided or are provided to or arranged upon the sheathed primary outer member in sections. The normally inner ends of these sections are each equipped with ferrules or collars 15, made of metal or other suitable material, staked or otherwise secured thereto. The opposite and outer ends of the sections of the secondary outer member 5, as well as their respective coverings 7, have other ferrules 16 similarly connected thereto.

Correspondingly constructed connecting fittings, generally identified by the numeral 17, are provided on the opposite or outer ends of the control cable. Each said connecting fitting generally consists of a tubular externally screw threaded body having a reduced sleeve-like extension 18 on its normally inner end, while its outer end is provided with a nipple-like extension 18' fixedly receiving therein the adjacent end of an end fitting tube 19. The primary outer member 3, together with its sheath 4, has its opposite or outer end portions engaged and suitably anchored in the particularly adjacent connecting fitting 17, while the ferrule 16 on the adjacent end of the secondary outer member 5, and its covering 7, is slidably engaged over the adjacent sleeve-like extension 18 of the fitting 17.

The opposite ends of the motion transmitting inner member 1, 2, are passed through the connecting fittings 17, provided the opposite or outer ends of the flexible control cable into their respective end fitting tubes 19, where they are fixedly connected to adjacent ends of operating rods 20, slidably received in said tubes 19.

To install our improved take-up upon the control cable, such as herein described, its body sections 9 and 9' are screw threadedly engaged to the particularly desired extent. Thereupon, the motion transmitting inner member, 1, 2 and the primary outer member 3, with its sheath 4, are passed longitudinally through the take-up body section 9', as shown in Figure 4 of the drawings. Following this, the divided portions of sections of the secondary outer member 5 and their particular coverings 7, are engaged over those portions of the sheathed primary outer member 3 extending from the opposite ends of the take-up and are brought into abutting or substantially abutting engagement therewith, i. e., their ferrule equipped ends (ferrules 15) are moved into such relationship with respect to the opposite ends of the take-up.

The take-up 8 will be left loose or inoperative on the control cable at the time of its installation. When the control cable assembly is properly installed and adjusted or bent, as may be required, it is clamped at either end. At this time, there has occurred an elongation of the secondary outer member 5, by reason of its bending and curving about and around various intermediate objects. Thereupon, the take-up 8, positioned intermediately of said secondary outer member 5, is longitudinally adjusted by turning or rotating the externally screw threaded body section 9' in the body section 9. Such rotation is effected in a direction to cause expansion of the take-up and thereby, play or undue motion between the connecting fittings 17 of the control and the secondary outer member 5 will be removed or prevented.

Instead of interpositioning our improved manual take-up 8 in the length of the secondary outer member 5, as hereinabove described, said take-up may be arranged adjacent either of the opposite ends of said member; or, if desired, two such take-ups may be utilized—one at either end of the secondary outer member 5, i. e., between the same and their respective end fittings 17.

From the foregoing, it will be understood by workers skilled in the art, that the hereinbefore described invention provides a control construction capable of carrying unusually heavy loads, and moreover, is especially advantageous for unusually difficult installations. Also, the combinations possible of the novel and original features of the improved control provide for a wide range of loads, all of which may be many times those loads which are practical for the now prevalent types of controls to carry efficiently.

In Figure 6 of the accompanying drawings, there is shown a modified form of take-up—an automatic spring take-up. This particular type of take-up is advantageous for use in control cable installations where it is required that the equipped cable be flexed through its length and the bends therein, during actual operation of the control. Generally stated, the spring means provided this particular take-up will function to accommodate the travel, i. e., the lengthening or shortening of the cable secondary outer or coiled wire member 5, during the aforesaid flexing of the control unit, in operation. It is to be understood that this modified form of take-up can, in addition to being individually installed in a control, be advantageously installed and used in a control equipped or provided with the manual type of take-up, illustrated in Figures 1, 3 and 4 of the accompanying drawings, and hereinbefore described.

The automatic spring take-up comprises relatively spaced sleeves 21 having their normally inner ends shouldered, as at 22. The sleeves 21 longitudinally and slidably receive the inner member 1', 2', and the primary outer member 3' and its braided wire sheath 6' therethrough, while the inner ends of the sections of the secondary outer member 5' and their respective woven covers 7', engaged over and about the greater portions of the length of the primary outer member 3' and its sheath 6', have metal ferrules 15' connected thereto, and such ferrules have abutting engagement with the outer ends of the sleeves 21.

A precompressed coiled spring 23 is engaged over and about that portion of the member 3' and its sheath 6' between the spaced sleeves 21. The opposite ends of said spring engage with and seat on the shouldered portions 22 of said sleeves.

At this point, it may be noted that the degree of compression of the spring 23 is in excess of any compression load which may be exerted, at any time, upon the secondary outer member 5'. It will, thus, be understood that with lengthening of the secondary outer member 5', during actual operation of the control, as when the inner member or cable 1', 2' is flexed to its maximum, the compressed coil spring 23 will contract, and in so doing, will automatically accommodate and compensate for such lengthening of the divided secondary outer member 5', i. e., its above described sections. At the same time, end play between the opposite outer ends of said member, and the adjacent ends of the connecting fittings 17 (described in connection with the preceding embodiment of our invention) will be avoided. Conversely, when the length of the secondary member 5' is shortened, as when the flexing is at the minimum during operation of the control motion transmitting inner member 1', 2', expansion of the spring 23 will move the sleeves 21 along the primary outer member 3' away from each other and against the adjacent ends of the secondary outer member 5'. Hence, travel of the secondary outer member 5', during such shortening of the same, will be automatically accommodated and compensated for by the spring take-up. When flexure of the control, by reason of its normal operation, with the resulting lengthening and/or shortening of the secondary outer member 5' is discontinued, it will be understood that the sections of the secondary member will assume their normal positions with relation to the fittings 17, and hence, end play between the outer opposite ends of the secondary outer member 5' and the adjacent portions of the connecting fittings 17 (hereinbefore described) will be avoided.

We claim:

1. A control, comprising a motion transmitting inner member, a helically coiled primary outer casing member receiving said motion transmitting inner member for sliding motion transmitting movement therein, a sectional helically coiled secondary outer member receiving said primary outer member, and spring means about a portion of said primary outer member arranged between and engaging the adjacent ends of the sections of said secondary outer member normally applying outwardly directed pressure thereto.

2. In combination with a control cable, including an inner motion transmitting member and an outer member receiving said inner member therethrough, comprising primary and secondary members, said primary member receiving the motion transmitting member for sliding motion transmitting movement therein, the secondary member being divided, and pressure exerting means arranged between the divided portions of said secondary member engaging the adjacent ends thereof.

3. In combination with a control cable, including an inner motion transmitting member and an outer member receiving the inner member therethrough, comprising primary and secondary flexible members, said primary member encasing the motion transmitting member for sliding motion transmitting movement therein, said secondary member being divided intermediately of its ends, and precompressed spring means arranged upon a portion of said primary member between the divided portions of said secondary member and engaging the adjacent ends thereof normally applying outwardly directed pressure thereto.

4. In combination with a control cable, including an inner motion transmitting member, a flexible tubular body receiving said member for sliding motion transmitting movement therein and a sectional flexible tubular body receiving said first body, precompressed spring means about a portion of said first body arranged between and engaging the adjacent ends of the sections of said second body.

5. A control, comprising a motion transmitting inner member, a helically coiled primary outer casing member receiving said motion transmitting member for sliding motion transmitting movement therein, a helically coiled secondary outer member receiving said primary outer casing member, and expansible means about a portion of said primary outer casing member engaging an adjacent portion of said secondary outer member for applying longitudinal pressure thereto.

6. A conduit for flexible control cables, comprising a primary laterally flexible normally non-elongating and non-compressing casing member for receiving the cable for sliding motion transmitting movement therein, a flexible member encasing said primary member, a sectional closely helically coiled pretensioned flexible and elongatable member receiving said primary and encasing members therethrough, and motion take-up means interposed between the sections of the sectional member engaging the adjacent ends thereof whereby to compensate for elongation of said sections during bending of the same.

7. A conduit for control cables, comprising a primary casing member formed of helically coiled spring material having the coils thereof relatively spaced one from the other for receiving the cable for sliding motion transmitting movement therein, a flexible member encasing the primary member, a sectional closely helically coiled pretensioned flexible and elongatable member receiving said primary and encasing members therethrough, and motion take-up means interposed between the sections of said sectional member and engaging the same whereby to compensate for elongation thereof during bending of the same.

8. A conduit for control cables, comprising a primary member formed of helically coiled spring material having the coils thereof relatively spaced one from the other, a flexible member encasing the primary member, a sectional closely helically coiled pretensioned flexible and elongatable member receiving said primary and length invariable members therethrough, fitting means connected to the outer ends of said primary and flexible members, and motion take-up means receiving the primary and flexible members therethrough and engaged with the adjacent ends of said sectional member whereby to compensate for elongation of the same upon lateral bending thereof.

9. A control cable, comprising, in combination, a motion transmitting inner member, an outer member receiving said inner member, said outer member including a helically coiled primary member receiving said inner member for sliding motion transmitting movement therein and a sectional flexible and elongatable secondary member receiving the primary member, and longitudinally adjustable means about a portion of the primary member engaging the adjacent ends of the sections of said secondary member.

ERNEST W. BATTERSON.
EUGENE A. MIDLING.